Patented May 1, 1945

2,374,646

UNITED STATES PATENT OFFICE 2,374,646

ARTIFICIAL RESINOUS CONDENSATION PRODUCTS AND THEIR MANUFACTURE

Cedric John Brown, West Kilbride, Scotland, assignor to Imperial Chemical Industries Limited, a corporation of Great Britain No Drawing. Application February 5, 1942, Serial No. 429,702. In Great Britain December 9, 1940

18 Claims. (Cl. 260—2)

The present invention relates to the manufacture of new artificial resinous condensation products applicable to many of the purposes for which natural or other artificial resinous materials are employed; and to compositions containing the resulting products.

The new resinous condensation products are obtainable in a thermoplastic or even fusible condition and can be transformed into an infusible and insoluble state by continued heating at suitably high temperatures. While they are still in the fusible or thermoplastic condition they are soluble in a variety of organic solvents, for instance alcohol, acetone and chloroform. They may be applied for moulding, coating or the like in dissolved or undissolved condition, and may be softened by means of plasticisers such as triarylphosphates, trialkyl phosphates, or dialkyl phthalates. In the still fusible or thermoplastic condition they have the valuable property of being compatible with rubber and various other polymeric resinous or rubber-like materials, for instance chlorinated rubber, phenol-formaldehyde resins and alkyd resins. The new resinous condensation products are insoluble in benzene and in paraffinic hydrocarbons, and mouldings, coatings and the like products made from them are resistant to liquid hydrocarbon internal combusion engine fuels. They are also of very low inflammabiliy.

The new resinous condensation products made in accordance with the present invention contain phosphorus in combined form as one of the elements taking part in their essential chemical structure. They are prepared by causing a reaction to take place between a liquid or fusible phosphonitrilic chloride polymer and certain hereinafter specified secondary and tertiary aromatic amide, in which at least some of the chlorine atoms of the phosphonitrilic chloride polymer enter into the formation of simple by-products free from phosphorus, and ordinarily also free from nitrogen. The resinous products obtained from a tertiary and the corresponding secondary aromatic amides used according to the invention are not recognisably different, the accompanying chlorine containing by-products however differing accordingly in their identity. The new resinous condensation products are believed to have the structure essentially of polymeric anils of anhydro-phosphimic acid, but they may still contain unaltered phosphonitrilic chloride units in the molecule. In their structure, in other words, it is believed that each phosphorus atom originally attached to two chlorine atoms in the phosphonitrilic chloride polymer becomes attached by a double bond linkage to a single nitrogen atom carrying an aryl group, as a result of the reaction in which it takes part.

The present invention is based on the discovery that when a liquid mixture of a phosphonitrilic chloride polymer and a secondary or tertiary aromatic amide, in the molecule of which the amido nitrogen atom is directly bound to an aromatic nucleus, and also to a carbon atom directly linked to a terminal oxygen atom or imido group and another group, is subjected to a temperature not below 150° C., an exothermic reaction takes place leading to the formation of a new and useful resinous condensation product and the formation of chlorides free from combined phosphorus.

Phosphonitrilic chloride occurs in various polymeric forms, and in putting the invention into effect any of the easily fusible polymers or tne liquid polymers may be employed. The temperature of reaction must not, however, exceed about 250° C. since at temperatures from about 250° upwards excessive sublimation or the formation of unsuitable rubber-like polymers of phosphonitrilic chloride commences. The trimer melting at 114° or the tetramer melting at 123.5° may, for instance, be employed.

There may conveniently be used a quantity of phosphonitrilic chloride approximately corresponding to one molecule, reckoned as monomer, for each secondary or tertiary amido group nitrogen atom directly attached to an aryl group in the amido-compound used.

The commencement of the reaction is usually evidenced by the development of a colour, and in the case of secondary amide evolution of hydrogen chloride; and a transparent plastic mass of tnermoplastic properties is formed. As heating is continued at the same or increasing temperature the solubility of the products tends to alter, and they become less thermoplastic; and a desirable variation in properties may thereby be obtained. If desired the heating of the phosphonitrilic chloride and the aromatic amide may be carried out in a solvent of suitably high boiling point, e. g. any of the following: decahydronaphthalene, nitrobenzene and pseudocumene. When the chlorides free from combined phosphorus formed in the reaction are volatile they may be removed from the product as the reaction proceeds, by evaporation advantageously under reduced pressure, but other methods for eliminating them may be required in some cases, for instance extraction with a medium in which the resinous condensation product is insoluble.

The aforesaid secondary and tertiary aromatic amides include arylated amides of carboxylic acids and arylated amidines of carboxylic acids, and the tertiary amides include N-alkali metal compounds as well as N-hydrocarbon substitution derivatives of the secondary arylated amides and amidines of carboxylic acids.

The secondary aromatic amide may consist for instance of anilides of carboxylic acids or homologues or substitution derivatives of these, or the corresponding polycyclic derivatives derived from naphthylamine and its substitution derivatives or homologues, or the alkali metal derivatives of these compounds. In such cases the chloride of a carboxylic acid is formed as one product of the reaction, and may be distilled from the reaction mixture if the carboxylic acid has not too high a molecular weight. When the alkali metal compounds are used an alkali metal chloride is formed instead of hydrogen chloride. Tertiary carboxylic acid derivatives of aromatic amines, their homologues and substitution derivatives, mono and di-aromatic urethanes, ureas and alkylated ureas and guanidines may also be used. As specific examples of secondary and tertiary amide which may be employed according to the invention there may be cited the following compounds: Acetanilide, proprionanilide, benzanilide, paranitroacetanilide, aceto-alphanaphthylamide, para-hydroxyacetanilide, phenyl urea, diphenyl urea, diphenyl-guanidine, dimethyl diphenyl urea, diethyl diphenyl urea, paratoluyl urethane, diphenyl urethane, phenyl urethane and sodium acetanilide.

The invention is further illustrated by the following examples, in which the parts are parts by weight.

*Example 1*

5.8 parts by weight of a solid phosphonitrilic chloride, consisting mainly of the trimer and tetramer, is intimately mixed with 6.8 parts by weight of acetanilide, and the mixture is heated until it has fused and is thereafter heated until it has reached a temperature of 200° C. at which it is maintained for two minutes. Hydrogen chloride and acetyl chloride are evolved during the course of the reaction and are removed under reduced pressure. The red resinous condensation product when cold is purified by grinding in a mortar with benzene, in which the condensation product is insoluble and acetanilide and phosphonitrilic chloride are freely soluble, and filtering, and washing several times with benzene. The product is soluble in alcohol and acetone, and may be used in alcohol solution for making a baking lacquer yielding a coating of low inflammability.

*Example 2*

5.8 parts by weight of a solid phosphonitrilic chloride consisting mainly of the trimer and tetramer together with 6.8 parts by weight of acetanilide, are dissolved in nitrobenzene, and the mixture is refluxed for three hours. Hydrogen chloride and acetyl chloride are evolved. After their removal by evaporation, other impurities remain in solution. The resinous condensation product precipitates out from the solution. It may be used for making moulded articles.

*Example 3*

5.8 parts by weight of a solid phosphonitrilic chloride consisting mainly of the trimer and tetramer, are intimately mixed with 10.6 parts by weight of symmetrical diphenyl urea. The mixture is fused and heated at 240° C. for four minutes. Hydrogen chloride and phenyl isocyanate are removed as volatile products. The yellow-green resinous condensation product is purified by grinding it with benzene, and washing several times with benzene. The product may be used in the manner indicated in Example 1.

*Example 4*

5.8 parts of a solid phosphonitrilic chloride consisting mainly of the trimer and tetramer are intimately mixed with 10.6 parts symmetrical diphenyl guanidine. The mixture is fused and heated at 240° C. for one minute. Hydrogen chloride and other volatile products are involved. The resulting green resinous condensation product is purified by grinding it with benzene and washing it several times with benzene. The product may then be worked into four times its weight of a viscous phenol formaldehyde condensation product until it has dissolved, and the product may be used as a baking lacquer.

*Example 5*

5 parts indiarubber dissolved in 100 parts decahydronaphthalene are mixed with 5.8 parts of the solid phosphonitrilic chloride polymer used according to the preceding examples. When the latter is dissolved, 13.4 parts diethyl diphenyl urea are introduced into the solution, which is then heated under reflux at the boiling point for one hour. As the reaction proceeds, the ethyl chloride and the phenol isocyanate are removed as volatile products, and there is precipitated from the solution a plastic material which contains both the condensation product from the diethyl diphenyl urea and the phosphonitrilic chloride polymer and the rubber. After this material has been washed with benzene it may be compounded with vulcanizing agents, vulcanizing accelerants, anti-oxidants, carbon black, zinc oxide and the like to form a multiple composition.

It is already known that resinous condensation products consisting mainly of phosphim-amides can be prepared by causing a reaction to take place between phosphonitrilic chloride polymers and various primary and secondary aromatic or aliphatic amines. In the formation of these phosphim-amides each phosphorus atom of the phosphonitrilic chloride polymer originally bound to 2 chlorine atoms taking part in the reaction was regarded as becoming attached by two single bond linkages to two nitrogen atoms each carrying an aryl group. The secondary amines specified were not those used according to the present invention, and although the resinous condensation products obtained shew certain similarities to those obtained according to the present invention their properties and composition are not the same. Thus in general the aromatic phosphimamide resins have neither so low a ratio of carbon to phosphorus content nor so low an inflammability as the corresponding anils of anhydrophosphimic acid obtained according to the present invention.

In the case where the secondary amide used according to the present invention is the anilide of a monocarboxylic acid, for instance acetanilide, hydrogen chloride, and the carboxylic acid chloride are formed as byproducts of the reaction, and the progress of the condensation may thus be followed by analysing the distillate, when, as is frequently the case, the carboxylic acid chloride is easily volatile. In the case of acetanilide the aqueous liquid used to absorb the hydrogen chloride formed may conveniently also be employed to effect hydrolysis of the acetyl chloride at the same time.

From an estimation of the volatile chlorine containing byproducts, in the case of the reaction between phosphonitrilic chloride polymer and acetanilide, it has been found that about two minutes heating of the reaction mixture at 200° C. is sufficient to remove about 87 per cent. of the chlorine content of the phosphonitrilic chloride polymer as volatile products of the reaction. The resinous product thus consists essentially of polymeric anils of anhydro-phosphimic acid, but may contain a small percentage of residual phosphonitrilic chloride units in their molecules depending on the conditions of heating the reaction mixture. The hypothetical anhydro-phosphimic acid would have the empirical formula NPO. In trimeric form the formula would be:

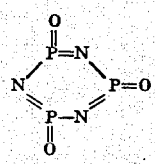

That of the trimeric anil would be:

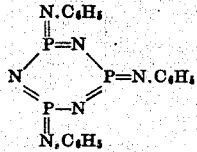

When a tertiary amide such as an N-sodium or N-alkyl anilide of a monocarboxylic acid is used, sodium chloride and the monocarboxylic acid chloride, or an alkyl chloride and the monobasic acid chloride are the byproducts formed. When a symmetrical diaryl urea is used, the byproducts are hydrogen chloride and an aryl isocyanate; and when a symmetrical dialkyl-diaryl urea is used the products are an alkyl chloride and an aryl isocyanate. These are usually volatile at the reaction temperature.

In homogenising the resins prepared according to the present invention with other resinous condensation products, it is frequently possible to carry out the condensation leading to the formation of the anil of anhydro-phosphimic acid in presence of the other resinous condensation product, for instance a phenol formaldehyde condensation product, which may conveniently be in a still unhardened condition.

The term "anil" is defined as in Webster's International Dictionary, second edition unabridged, as "A compound with a bivalent radical of the group $C_6H_5N=$ or (by extension) of the group $RN=$, R standing for any univalent aromatic radical."

It is to be understood that the foregoing detailed description is given merely by way of illustration and that many variations may be made therein without departing from the spirit and scope of the invention.

I claim:

1. A resinous polymeric anil of anhydro-phosphimic acid.

2. A resinous product having a structure characterised by anhydrophosphimic acid anil groups having double bond linkages between phosphorus atoms and nitrogen atoms directly attached to aryl groups.

3. A resinous condensation product of a phosphonitrilic chloride polymer and an aromatic amido compound, the structure of said resinous condensation product being characterised by anhydrophosphimic acid anil groups having double bond linkages between phosphorus atoms and nitrogen atoms directly attached to aryl groups.

4. A process for the manufacture of a resinous condensation product which comprises heating a liquid mixture of a phosphonitrilic chloride polymer and an aromatic amide in the molecule whereof the amido group nitrogen atom is directly bound to an aromatic nucleus, at a reaction temperature of 150–250° C.

5. A process for the manufacture of a resinous condensation product which comprises heating a liquid mixture of a phosphonitrilic chloride polymer and an aromatic amide in the molecule whereof the amido group nitrogen atom is directly bound to an aromatic nucleus at a reaction temperature of 150–250° C., and removing the byproducts of the reaction.

6. A process as claimed in claim 5 wherein the byproducts of the reaction are distilled from the reaction mixture.

7. A process as claimed in claim 4 wherein the aromatic amide used is a secondary amide.

8. A process as claimed in claim 4 wherein the amide used is a tertiary amide.

9. A process as claimed in claim 4 wherein the aromatic amide employed is an anilide of a monocarboxylic acid.

10. A process as claimed in claim 4 wherein the aromatic amide employed is acetanilide.

11. A process as claimed in claim 4 wherein the aromatic amide employed is a symmetrical diarylurea.

12. A process as claimed in claim 4 wherein the aromatic amide employed is a symmetrical diarylguanidine.

13. A process as claimed in claim 4 wherein the aromatic amide employed is a symmetrical dialkyldiaryl urea.

14. A composition containing rubber and a resinous product having a structure characterised by anhydrophosphimic acid anil groups having double bond linkages between phosphorus atoms and nitrogen atoms directly attached to aryl groups.

15. A composition containing a resinous product of which the structure is characterised by anhydrophosphimic acid anil groups having double bond linkages between phosphorus atoms and nitrogen atoms directly attached to aryl groups, and a plasticizing polybasic acid ester of the class consisting of triaryl and trialkyl phosphates and dialkyl phthalates.

16. Shaped articles comprising a thermohardened form of a resinous condensation product characterised by anhydrophosphimic acid anil groups having double bond linkages between phosphorus atoms and nitrogen atoms directly attached to aryl groups.

17. A resinous polymeric anil of anhydro-phosphimic acid, containing in polymeric combination the anil of the empirical formula $C_6H_5NPN$.

18. A composition containing rubber and a resinous product characterized by anhydro-phosphimic acid anil groups having double bond linkages between phosphorus atoms and nitrogen atoms directly attached to phenyl groups.

CEDRIC JOHN BROWN.